United States Patent [19]

Tamkin

[11] 3,814,989

[45] June 4, 1974

[54] COMBINATION HIGH VOLTAGE MULTIPLIER AND FOCUS VOLTAGE DIVIDER FOR A TELEVISION RECEIVER WITH HOUSING MEANS

[75] Inventor: Michael S. Tamkin, Chicago, Ill.

[73] Assignee: Zenith Radio Corporation, Chicago, Ill.

[22] Filed: May 4, 1973

[21] Appl. No.: 357,281

[52] U.S. Cl. .............. 317/120, 174/52 PE, 317/100
[51] Int. Cl. .......................... H02b 1/10, H05k 5/06
[58] Field of Search ........ 317/100, 101 R, 103, 120; 174/52 PE; 321/2 HF, 15; 178/5.4 RC, 7.9, DIG. 11

[56] References Cited

UNITED STATES PATENTS

| | | | |
|---|---|---|---|
| 3,383,565 | 5/1968 | Gutton | 174/52 PE |
| 3,721,865 | 3/1973 | Rademaker | 317/120 |
| 3,748,538 | 7/1973 | Shekerjian | 174/52 PE |
| 3,771,024 | 11/1973 | Dumas | 317/100 |

OTHER PUBLICATIONS

Motorola, Color TV Chassis TS-915 and 919 Series, Sept. 1967, Sheet 68P65129A39-A-UP, Motorola Product Technical Training.

*Primary Examiner*—Robert K. Schaefer
*Assistant Examiner*—Gerald P. Tolin
*Attorney, Agent, or Firm*—Nicholas A. Canasto; John J. Pederson

[57] ABSTRACT

An insulated two-compartment, epoxy-filled case houses a combination high voltage multiplier and focus voltage divider for a television receiver. The multiplier capacitors and diodes are mounted on an apertured insulated circuit board located in one compartment. An upstanding current limiting resistor, mounted to the board provides an internal high voltage connection point, below the level of encapsulant, for the picture tube anode lead and for a lead to the focus voltage divider resistor, which is printed on an alumina substrate and located in the other compartment.

6 Claims, 5 Drawing Figures

COMBINATION HIGH VOLTAGE MULTIPLIER AND FOCUS VOLTAGE DIVIDER FOR A TELEVISION RECEIVER WITH HOUSING MEANS

BACKGROUND OF THE INVENTION

This invention relates generally to high voltage systems in television receivers and particularly to color television receivers having picture tubes requiring a high DC anode voltage source and an intermediate DC focus voltage source. Optimum focus in the picture tube display is attained by having the focus voltage track or follow fluctuations in anode voltage such that a relatively fixed ratio between the anode and focus voltages is maintained. In most television receivers the high DC anode voltage required for the picture tube is derived by rectifying retrace pulses produced by the horizontal deflection system. Until recently, most high voltage rectifiers were of the vacuum tube type driven from a high voltage winding on the horizontal output transformer. Solid state rectifiers have all but replaced vacuum tube devices because of their size and cost advantages, and most importantly, because of their freedom from x-radiation.

The use of solid state high voltage rectifiers in appropriate voltage multiplication circuitry has further advanced the television art in that the horizontal output transformers have been substantially reduced in size and weight, and built to even higher standards of reliability. For example, a conventional 25 KV high voltage supply required a 25 KV voltage pulse from the high voltage winding on the horizontal transformer. With a voltage multiplier such as a "tripler," for example, the output required from the transformer need only be a third of the final output, which results in dramatic reductions in size and insulation requirements.

Solid state voltage multipliers are known and generally take the form of a plurality of capacitors and diodes, of high voltage rating, interconnected in a series-parallel ladder-like configuration, on either a printed circuit board or other supporting means, to which is attached appropriate terminals.

A further improvement in color television receivers resulted from circuitry deriving the focus voltage for the picture tube directly from the anode voltage supply, which enabled the focus voltage to more accurately track the picture tube anode potential and maintain a fixed anode voltage/focus voltage relationship for optimum beam focus.

One such focus voltage divider commonly used comprises a printed resistance element which is fabricated by printing a resistive ink in a sinuous pattern on an alumina substrate with a "trimmable" area of resistive ink bridging a pair of adjacent segments of the sinuous pattern. The trimmable area of bridging resistive ink constitutes a low resistance which may be increased by removal of portions thereof until the desired resistance is obtained. Prior to resistance printing, other areas of conductive inks or metals are deposited to form the terminal connection points or conductive pads on the divider. The alumina is fired to fix the resistive ink and deposited metals. After firing, connectors or terminal lugs are attached by soldering at the appropriate conductive pads on the substrate. Because of the fragility and thermal characteristics of the alumina substrate, the substrate is preheated to prevent local expansion during soldering from causing damage.

The acceptance of solid state devices in the high voltage sections of television receivers has been accomplished by encapsulation type packaging for providing "environment-insensitive" components.

Thus, it is known to encapulsate focus voltage divider resistors, both in discrete form and in the above-mentioned form of a printed resistance element on an alumina or other ceramic substrate. It is also known to encapsulate a voltage multiplier, consisting of a ladder-like configuration of diodes and capacitors, for use in conjunction with a television receiver. The encapsulation not only enables convenient handling and replacement of the unit, but substantially lessens the danger of exposure to high voltage, and makes for a controlled environment for these environment sensitive components. The encapsulation is usually in a highly insulating medium such as epoxy which provides another benefit in that the components are more closely spaced than would be possible were they exposed to air thus further reducing size and cost.

It has been proposed to encapsulate both the voltage multiplier and the focus voltage divider in a common insulating case, thus making a unitary assembly which may be readily installed or replaced, should the need arise. However, numerous difficulties quickly become apparent.

Because of the high voltages involved, voltage multiplier structures should be thoroughly cleaned (generally in an ultrasonic cleaning bath) and tested prior to encapsulation. The presence of solder flux and other contaminants is incompatible with a reliable high voltage multiplier. This is especially true where soldering operations have been performed at or near the components or supporting circuit board. Thus, in a combination multiplier-focus voltage divider all solder connections between the multiplier and focus voltage divider should be completed prior to cleaning and testing.

The high test voltage and close spacing between components dictates that the voltage multiplier be tested in a vacuum or inert atmosphere. Testing in air can result in destructive arcing between the components.

Unless a disconnectable high voltage lead is provided for connecting the voltage multiplier output and the anode on the picture tube, a cumbersome piece of heavy wire must be attached to the multiplier and focus divider, at least before the cleaning and testing phases. Such restrictions hamper production efficiency and in general make for a very difficult-to-handle assembly.

There are also other problem areas associated with the manufacture of encapsulated high voltage multipliers. For example, in most television receivers, the high voltage is generated by a separate winding on the horizontal deflection transformer, which winding is tuned or resonated, thus requiring a certain value of connected capacitance. The multiplier is driven from this winding and supplies the resonating capacitance in the form of input capacitance. The input capacitance of the multiplier must, therefore, be predictable in any production operation.

Taking a conventional 5 × 5, i.e., five diodes and five capacitors, diode-capacitor multiplier and assigning a reasonable value of 1 picofarad capacitance to each of the diodes, it is apparent that the minimum input capacitance of the multiplier is a little more than 5 picofarads. This is very small and imposes stringent restrictions on the positioning of the capacitors in the multiplier. It has been found that minor displacements in orientation of the capacitors, such as would normally occur were they not mounted in a fixed relationship, produces substantial variations in input capacitance. It goes without saying that having components with controllable tolerances allows the end product to be operated nearer to its design center, which is highly desirable.

A circuit board for mounting the diodes and capacitors in fixed spatial relationship largely eliminates the problem of input capacitance variations. The circuit board, however, introduces another problem in that the epoxy encapsulant contains air bubbles which if not driven out may prevent the the epoxy from completely surrounding the board and mounted components. Local epoxy voids do not have the requisite dielectric strength and can lead to electrical breakdown and failure of the multiplier. To guard against this possibility, the circuit board of the multiplier of the invention includes apertures to assist the exit of bubbles from the epoxy. Further, the apertures are made relatively large and positioned between conductive areas on the circuit board so that should an epoxy delamination occur, i.e., a separation between the epoxy and circuit board, a "column" of insulating epoxy is established between points of differing potential which effectively lengthens any potential flashover paths.

OBJECTS OF THE INVENTION

Accordingly, it is a principal object of the invention to provide an improved high voltage rectifier and focus voltage divider assembly for a television receiver.

Another object of the invention is to provide a unitary encapsulated solid state high voltage multiplier and focus voltage divider which solves the problems of the prior art.

SUMMARY OF THE INVENTION

These and other objects of the invention are achieved in accordance with the preferred embodiment of the invention wherein an insulating-double-compartment case includes a ladder-like arrangement of diodes and capacitors mounted on an apertured circuit board supported in one of the two compartments and a focus voltage divider, comprising a deposited resistance on an alumina substrate, mounted in the other compartment. A plurality of low voltage connecting terminals extend above the encapsulant surface for connection to appropriate points in the television receiver. High voltage connector means, comprising an upstanding current limiting resistor, mounted at one end of the circuit board, provides at its other end a high voltage connection point for an interconnecting lead from the focus voltage divider and for the high voltage anode lead for the picture tube. The high voltage connection point is well below the encapsulant surface, but sufficiently away from the surface of the circuit board to permit soldering thereto after final clean up of the circuit board and mounted components. The circuit board assures a predictable value of input capacitance for the voltage multiplier by maintaining consistent parts orientation. The apertures in the board aid the epoxy encapsulant in the degassing process and establish columns of insulating epoxy between points of different potential.

DESCRIPTION OF THE PREFERRED EMBODIMENT

Figures 1, 2, 3, 4:
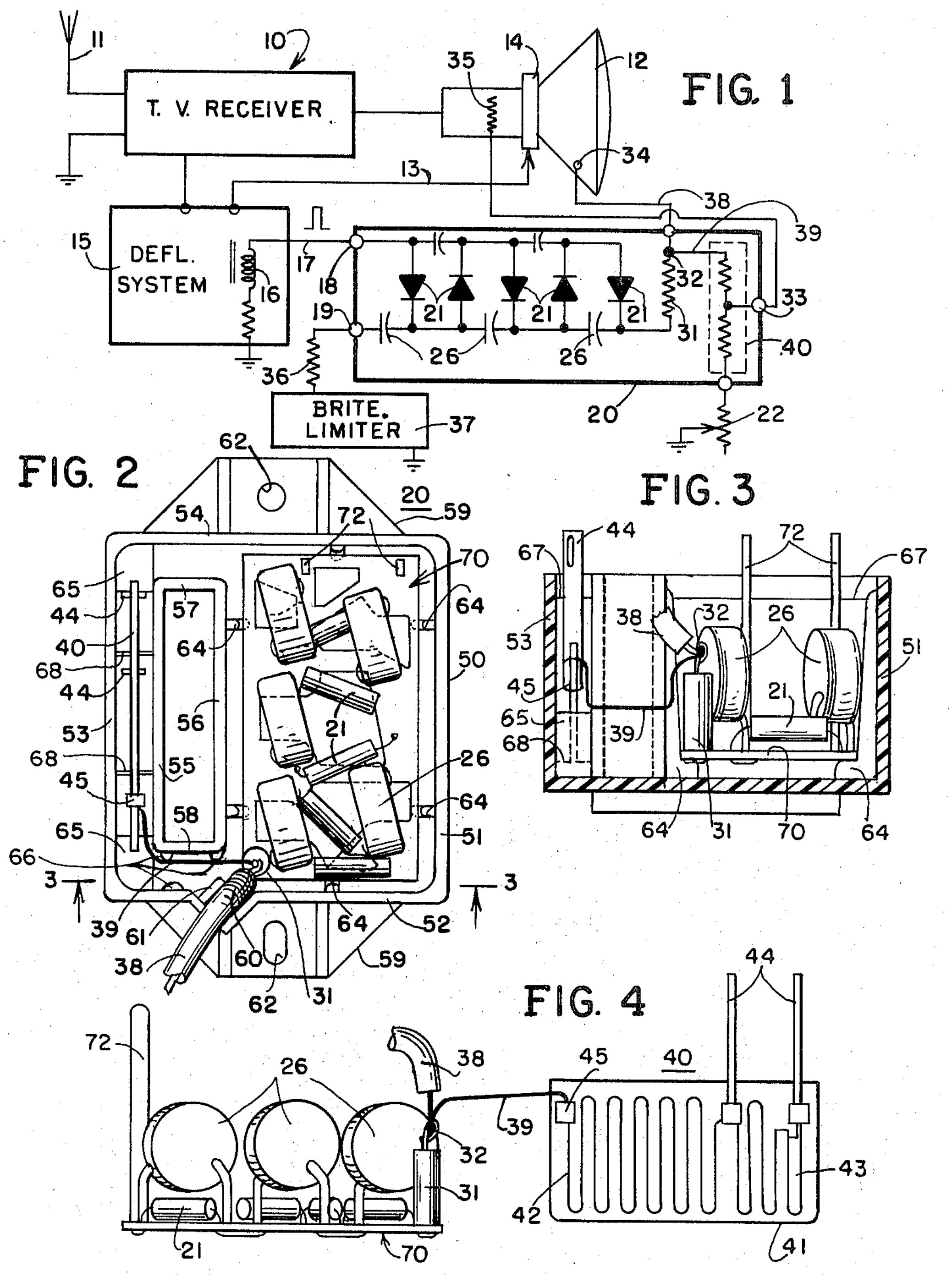
FIG. 1 depicts a television receiver featuring a high voltage system incorporating a combination high voltage multiplier and focus voltage divider arranged in accordance with the invention.
FIG. 2 is a top view of the combination multiplier and focus voltage divider schematically shown in FIG. 1 in an insulating case.
FIG. 3 is a view of the case of FIG. 2 taken along line 3—3.
FIG. 4 shows the finished but unencapsulated high voltage multiplier circuit board and alumina substrate focus voltage divider.

Referring to FIG. 1, a television receiver 10 and an antenna 11 receives and translates broadcast television signals and drives a picture tube 12 with the video information contained therein. Receiver 10 supplies appropriate control signals to a deflection system 15 which drives, over a lead 13, a yoke 14 mounted on the neck of picture tube 12. It will be appreciated by those skilled in the art that deflection system 15 includes well-known apparatus for deriving vertical and horizontal deflection currents to develop the requisite magnetic fields in yoke 14 for proper scanning of picture tube 12. In the case of color television receivers, it will further be appreciated that appropriate convergence signals are produced in conjunction with deflection system 15 for application to suitable convergence apparatus (not shown) associated with picture tube 12. All of the above is well-known in the art and is not relevant to the instant invention.

A high voltage winding 16 in deflection system 15 generates pulses during the horizontal line retrace periods for application, over a lead 17, to a low voltage input terminal 18 of a high voltage system 20. It will be understood that high voltage winding 16 constitutes a portion of a horizontal deflection transformer which, while being an integral part of the television receiver high voltage generation system, is for the purpose of descriptive convenience, not shown in detail. Thus, as used in the context of this specification, high voltage system 20 comprises the combination voltage multiplier and focus voltage divider of the invention.

High voltage system 20 includes a plurality of diodes 21 and capacitors 26 interconnected in a ladder-like series-parallel arrangement for developing a potential of a magnitude approximating substantially three times the magnitude of the pulses supplied at input terminal 18. Such an arrangement of diodes and capacitors will be recognized as defining a voltage "tripler." It will also be recognized that the number of diodes and capacitors may be increased or decreased to effect corresponding increases or decreases in the developed potential, i.e., change the value of the "multiplier" in the voltage multiplier arrangement. High voltage connector means in the form of a current limiting resistor 31 couples the developed high voltage to a high voltage connection point 32, which in turn is connected, over a high voltage lead 38, to an anode connection 34 on the picture tube. Point 32 is further connected, by an interconnecting lead 39, to a focus voltage divider 40 (shown in dashed lines) in high voltage system 20. The low voltage side of focus voltage divider 40 is returned to ground through a variable focus control potentiometer 22.

A DC focus voltage is taken from a tap on focus voltage divider 40 and applied over an appropriate lead 33 to a focus control electrode 35 in picture tube 12. The other low voltage input terminal 19 of high voltage system 20 is connected through a resistor 36 to a Brightness Limiter 37 which includes circuitry (not shown) for providing picture brightness limiting action for television receiver 10. Neither the circuitry of Brightness Limiter 37 nor its function is germane to the instant invention, it being included only for the purposes of completeness. For simplicity, terminal 19 may be considered connected to ground potential through a small resistance.

It will be understood that with the exception of the physical arrangement of the parts schematically shown in high voltage system 20, all of the apparatus of FIG. 1 is conventional and well-known in the art.

In FIG. 2, the preferred form of high voltage system 20 is shown and includes an insulated case 50 containing the high voltage multiplier and focus voltage divider of FIG. 1. The case is preferably plastic and formed into a generally cubical configuration with a plurality of upstanding outer side walls 51–54. The case has an open top and is substantially divided into two spaced compartments by the provision of upstanding inner walls 55–58 which define a "chimney" in case 50. The larger of the two compartments is defined by outer walls 51, 52, 54 and inner wall 56 and the smaller by outer wall 53, inner wall 55 and the small sections of outer walls 52 and 54. A pair of flanges 59, each including an appropriate hole 62 for reception of a fastener, is attached to the case to permit convenient installation thereof in a television receiver. A pair of channels are defined by the spaces between walls 57 and 54 and between 58 and 52, respectively. These channels allow flow of liquid encapsulate from one compartment to the other.

Outer wall 52 is formed with an outwardly projecting portion adjacent a corner of the large compartment and defines two sides of a U-shaped well 60. The other side of well 60 comprises a flap 61 which is resilient and outwardly displaceable to allow high voltage lead 38 to be forced into well 60, where it is captivated.

As is seen more clearly in FIG. 3, the compartments are separated by the chimney (except for the small channels or passages at the short ends thereof). The provision of a chimney or air separation between the compartments assists in dissipating the heat produced by the focus voltage divider.

The high voltage multiplier comprises a plurality of diodes and capacitors interconnected on a circuit board 70. Circuit board 70 includes an end-mounted current limiting resistor 31 providing a high voltage connection pont 32 at its upper terminal. The lower terminal of resistor 31 is secured to circuit board 70. A pair of conventional metal connector terminals 72 are connected to circuit board 70 and extend above the top of case 50. The terminals may be affixed to the board in any well-known manner, such as by staking and soldering. The circuit board is supported horizontally and vertically in its compartment by a plurality of supporting tabs 64 formed therein. The presence of resistor 31 may not be required depending upon the operating conditions imposed. In such case, resistor 31 may be replaced with a conventional metal terminal such as those indicated by reference numeral 72, with the important difference that the top of the terminal (point 32) must be well below the level of encapsulant indicated by line 67.

The focus voltage divider, as more clearly seen in FIG. 4, comprises an alumina substrate 41 upon which is deposited a sinous pattern of resistive ink 42 forming a printed resistance element. An end portion 43 of the pattern is filled in or "bridged" with resistive ink, thus forming a lower resistance segment for trimming purposes. The resistance of this segment may be increased by removal of some of the bridging resistive ink. In this manner, the ratio of resistances between the different portions of the divider may be adjusted to fall within design specifications.

The resistive pattern terminates at one end in a conductive pad 45, at which point interconnecting lead 39 from the voltage multiplier is attached. Thus, pad 45 has the full high voltage output of the multiplier applied thereto. A pair of low voltage terminals 44 are soldered to similar conductive pads on the alumina substrate at appropriate points. As best seen in FIG. 2, the alumina substrate is vertically supported in case 50 by a pair of grooves in support means 65 which are integrally formed at opposite ends of the small compartment. The substrate is supported away from the bottom of case 50 by a pair of ridges 68 formed in case 50. Low voltage terminals 44 also extend above the top of the case providing ready access thereto. Conductive pad 45 will be seen to be well below encapsulant level 67 and is connected to the upper terminal of limiting resistor 31 (high voltage connection point 32) on the voltage multiplier by interconnecting lead 39. Lead 39 passes from the small compartment to the large through the channel between inner wall 58 and outer wall 52 and is maintained out of contact with these walls by a plurality of spacers 66 formed therein. An alternative to spacers 66 is to use an insulated wire for interconnecting lead 39. Focus voltage divider 40 is also well-known in the art and its construction details do not constitute any part of this invention.

The side view of circuit board 70 clearly shows all diodes, capacitors and terminals mounted on one side of the board, thus enabling the underside of the board to be wave soldered, which assists in achieving production economies. Further, high voltage lead 38 is connected at a point substantially above the surface of board 70 which is attractive because the voltage multiplier may be fabricated, cleaned and thoroughly tested, in an appropriate high voltage testing atmosphere, without having the high voltage lead and substrate 41 attached. The solder connections may be made just prior to insertion of the multiplier and focus voltage divider into case 50 or even after placing the components in the case. Preferably, the solder connection is made without the use of flux as by the mere application of heat to the previously tinned ports. Thus, provision of high voltage connection point 32 away from the circuit board and its components substantially simplifies manufacturing and testing.

Also, as mentioned above, use of the circuit board assures predictable spatial relationships between the component diodes and capacitors thus enabling ready manufacture of high voltage multipliers with consistent input capacitances. This is a very important feature and has made a substantial contribution to produceability of the multiplier.

Figure 5:
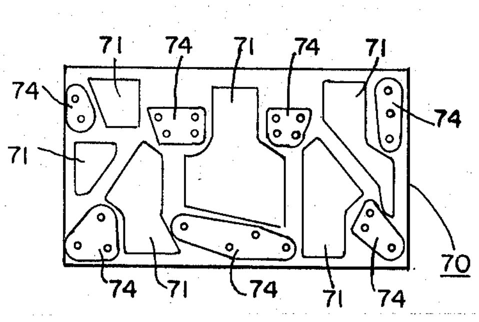
FIG. 5 is a bottom view of the circuit board of FIG. 4 more clearly indicating the preferred shape and positioning of the apertures therein.

In FIG. 5, a plurality of apertures 71 are shown in circuit baord 70. These apertures are shaped and positioned to interpose an aperture between conductive areas 74 of different potential on circuit board 70 while retaining the structural integrity of the board. It will be appreciated that conductive areas 74 form the interconnection points of the capacitors and diodes of the voltage multiplier. As illustrated, conductive areas 74 constitute metallized surfaces on board 70, and may conveniently be formed by etching or plating. However, these conductive areas may also be established mechanically by affixing conductive eyelets or the like to the board.

The severe operational conditions imposed on components operating in a high voltage atmosphere dictate the exclusive use of high quality components. This is especially true where combinations of parts are incorporated in a unitary case or environment, since failure of any single part necessitates replacement of the whole. High quality insulating epoxies will adequately protect against voltage breakdown between components. Circuit board induced failures are also a distinct possibility and Applicant has selected an Epoxy glass board which is approximately 1/32 inch thick, and consists of a woven glass mat impregnated with epoxy.

As intimated above, ideally (for insulation and reliability) no circuit board would be used. But the advantages of predictable input capacitance and consistency of manufacturing outweigh this consideration. Also, as mentioned above, the use of a circuit board poses the serious problem of expoy voids and delaminations occurring during encapsulation, thus creating areas of very poor dielectric strength. The provision of large apertures 71 between conductive areas 74 of different potential not only materially assists in degassing of the epoxy during encapsulation, but provides "columns" of highly insulating epoxy between areas 74. Thus, in the unlikely event that an epoxy void occurs between these areas, the path of any possible breakdown will be lengthened because the epoxy "columns" must be circumvented. This feature adds a totally new dimension of reliability to the encapsulated multiplier.

Thus, it will be seen that the invention provides a readily manufacturable, highly reliable combination high voltage multiplier and focus voltage divider of enhanced characteristics. It is recognized by those skilled in the art that changes and modifications may be made without departing from the invention in its broader aspects, and, therefore, the aim in the appended claims is to cover all such changes and modifications as fall within the true spirit and scope of the invention.

What is claimed is:

1. In a high voltage system for a television receiver including a deflection transformer with a high voltage winding requiring a tuning capacitance, and a picture tube optimally having a fixed anode voltage-focus voltage ratio, a readily manufacturable combination high voltage multiplier and focus voltage divider exhibiting predictable input capacitance and high degree of reliability comprising:

an insulating case defining first and second interconnected compartments for holding an insulating epoxy encapsulant at a given level;

a high voltage multiplier, including a first high voltage connection point and low voltage connection points, mounted in one of said compartments, said high voltage multiplier including a plurality of capacitors and diodes, interconnected in a ladder-like configuration between said connection points, mounted in fixed spatial relationship on an apertured support member, said fixed spatial relationship defining said input capacitance;

a focus voltage divider in the other of said compartments, said focus voltage divider comprising a printed resistance element on an alumina substrate with low voltage connection points and a second high voltage connection point;

high voltage connector means having one end affixed to said apertured support member in electrical contact with said first high voltage connection point and another end extending above said support member to a level less than said given level;

a plurality of low voltage connectors attached to the low voltage connection points of both said multiplier and said focus voltage divider, said low voltage connectors extending above said given level; and an electrical interconnection extending between said compartments connecting said second high voltage connection point on said focus voltage divider to said other end of said high voltage connector means.

2. In a high voltage system as set forth in claim 1 wherein said apertured support member comprises a circuit board of high dielectric strength with conductive areas interconnecting said capacitors and said diodes and defining apertures between adjacent ones of said conductive areas for insuring formation of insulating columns of epoxy therebetween.

3. In a high voltage system as set forth in claim 2 wherein said high voltage connector means comprises an upstanding resistor having one lead connected to said circuit board and the other formed into a connector terminal.

4. In a high voltage system as set forth in claim 2 wherein said compartments are interconnected by a channel providing communication therebetween for flow of liquid epoxy encapsulant.

5. In a high voltage system as set forth in claim 2 further including an insulated high voltage wire, for attachment to the anode of said picture tube, connected to said high voltage connector means.

6. In a high voltage system as set forth in claim 5 wherein said one compartment includes a captivating well formed in a wall thereof adjacent said high voltage connector means for retention of said high voltage wire.

* * * * *